United States Patent Office 3,442,579
Patented May 6, 1969

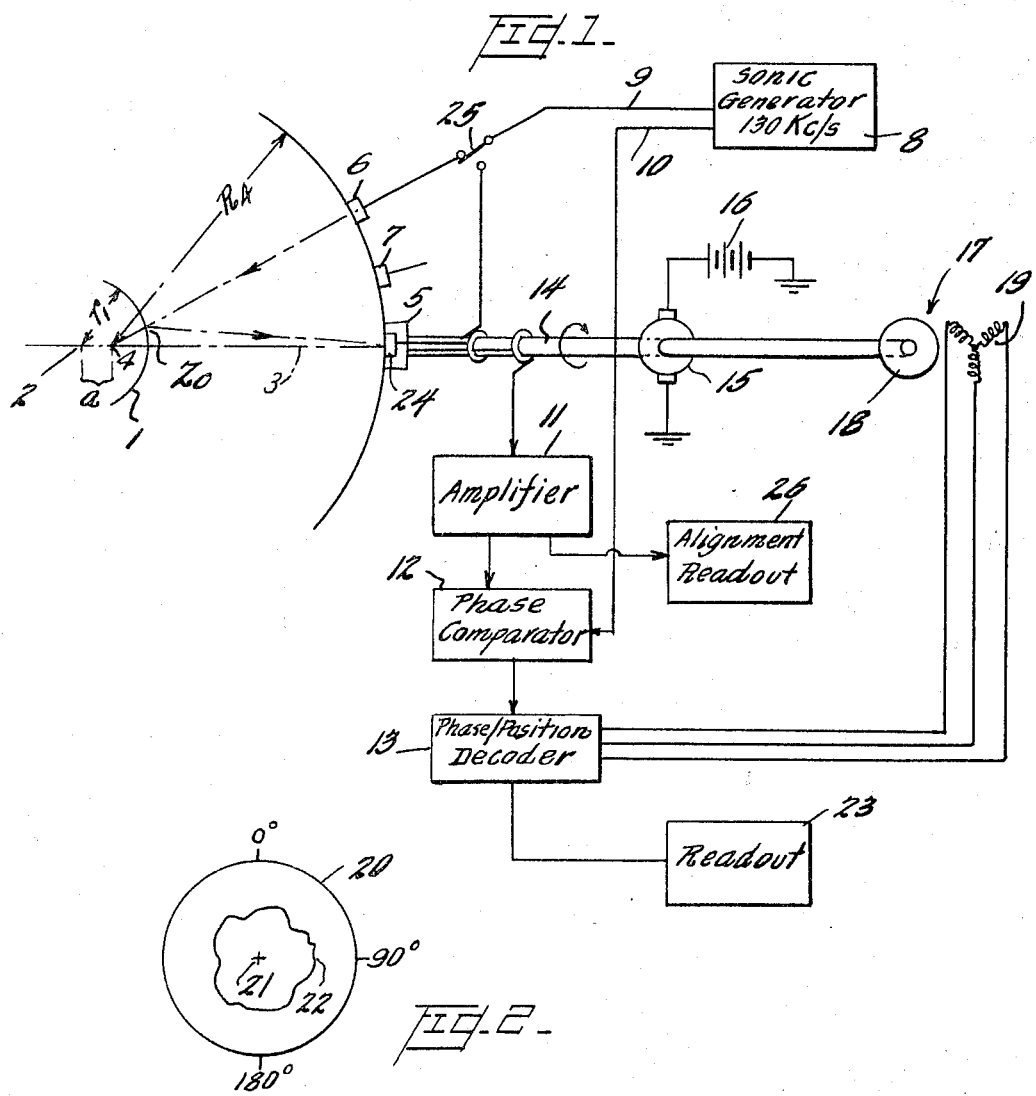

3,442,579
APPARATUS FOR MEASURING AND PLOTTING THE SURFACE CONTOUR OF THE EYE BY THE USE OF SONIC COMPRESSIONAL WAVES
Michael A. Friedberg, 1400 Squirrel Hill Ave., Pittsburgh, Pa. 15217
Filed Nov. 29, 1965, Ser. No. 510,284
Int. Cl. A61b 3/10
U.S. Cl. 351—6
4 Claims

ABSTRACT OF THE DISCLOSURE

Sonic compressional waves are projected against the surface of the eye from a point of transmission which is continuously rotated about the optic axis of the eye and one reflected from the eye surface to a point on the optic axis where they are detected. The phase displacement of the detected waves is a function of the distance of the eye surface from a hemispherical reference platform including the focal point and the path of rotation of the transmittal point, and this phase displacement is utilized to establish an analogue signal which is a function of the deviation of the actual eye surface contour from a predetermined symmetrical configuration.

---

This invention relates to a method and apparatus for measuring and plotting the surface contour of the eye by the use of compressional waves in the sonic range. More specifically, the invention involves the projection of sonic compressional waves against the surface of the eye from a point continuously rotated about the optic axis of the eye and detecting the sonic energy reflected from the surface of the eye to a focal point on the optic axis. The phase displacement of the detected return energy is a function of the distance of the eye surface from a hemispherical reference platform including the focal point and the path of rotation of the transmittal point, and this phase displacement is utilized to establish an analogue signal which is a function of the deviation of the actual eye surface contour from a predetermined symmetrical configuration.

The problem of accurately and precisely determining the surface configuration of the eye has plagued the field of eye care for many years, but the need for such a determination has become increasingly acute with the advent of contact lenses which require accurate fitting to the eye surface. Clinical approaches in the past have involved the use of the ophthalmometer, which is limited in its effectiveness to measurement of only the central corneal area. More recently, photographic methods have been developed which comprise somewhat involved procedures of photographic interpretation. See, for instance, my U.S. Patent No. 3,169,459 issued Feb. 16, 1965, for "Method of Determining Surface Contours of the Eye."

The present invention relates to a sonic means for measuring the surface contour of the eye, and has as its objects:

(1) the provision of a method which is simple enough to be readily adapted to clinical use,
(2) the provision of a method which provides measurements of extreme accuracy,
(3) the provision of a method which avoids actual contact with the surface being measured,
(4) the provision of a method which provides a read-out in readily usable form, and
(5) the provision of an apparatus for carrying out the aforementioned objects which is simple in calibration and operation.

The manner in which this invention accomplishes the foregoing and other obvious objects and advantages will be more readily understood by reference to the following description of a particular embodiment of the invention, and by reference to the accompanying drawings, in which FIGURE 1 is a diagrammatic representation of an apparatus for carrying out this invention illustrating the physical relationship of the apparatus components to a patient's eye, FIGURE 2 is a diagrammatic representation of a plot of an eye contour obtained by the practice of this invention.

Referring first to FIG. 1, numeral 1 represents the surface of a patient's eye, the radius of this surface being represented by $r_1$. The center of curvature 2 of the eye surface 1 is located on the optic axis indicated by dotted line 3. In order to properly orient the components of the apparatus for carrying out this invention, there is established as a platform of reference a semispherical perimeter centered about the optic axis 3 and having a center of curvature 4 lying on said optic axis. The radius of the platform of reference is represented by the letter $R_4$. Disposed on the platform of reference are transducers, such as indicated at 5 and 6. Optionally, additional transducers may be provided, as at 7, at other locations within the platform. The transducers may be of the magnetostrictive type well known in the field of compressional wave generation and detection, and function by a change in physical dimension in relation to the electrical energy supplied to or derived from the transducer to convert energy between the electrical and the compressional state.

A conventional electrical generator 8 operating at a frequency within the sonic range and optionally established at 130 kcs. is provided with two outputs. The first output 9 is fed to transducer 6 which converts the electrical energy to compressional wave energy and thus establishes a point of transmittal on the platform of reference. The second output 10 establishes a reference for phase comparison with the returned signal in a manner yet to be described. The compressional wave output of transducer 6 is directed in a narrow finite beam toward the center of curvature 4 of the platform of reference, and intersects the surface of the eye 1 at a point indicated as $Z_0$ in FIGURE 1. If the surface of the eye were normal to the transmitted compressional wave beam at this point, as would be the case if the centers of curvature 2 and 4 were coincident, the major portion of the compressional wave energy would be reflected back along the transmitted beam path to the point of transmittal due to the narrow beam characteristic. In this event, only an ineffective amount of stray energy would be reflected in divergent paths including a path directed toward the optic axis 3. In carrying out this invention, it is essential that the major portion of the compressional wave energy be reflected back to the platform of reference in a path intersecting transducer 5 which is located at a focal point comprising the intersection of the optic axis 3 and the platform of reference, and is operated as a receiver to convert the returned compressional wave energy to electrical energy for utilization in the subsequent phase comparison. To this end, the center of curvature 4 of the platform of reference is displaced outwardly along the optic axis 3 from the center of curvature 2 of the eye. Thus, the eye surface 1 at point $Z_0$ deviates from normal with respect to the transmitted beam in a manner to cause reflection of the major compressional energy in a return path incident to transducer 5.

It is evident that the signal derived at transducer 5 will be delayed in time from that transmitted at transducer 6 by an amount dependent upon the sonic transit time, i.e., the time required for the compressional wave energy to travel from the point of transmittal (transducer 6) to the focal point (transducer 5), and that this time is dependent upon the distance of the reflecting point $Z_0$ of the eye surface from the platform of reference. Thus, the electrical signal derived at transducer 5 is displaced in phase by an amount which is a function of this distance.

In order to provide a readily readable display of the information so derived, the electrical output of transducer 5 is amplified in a conventional amplifier 11 and fed to a phase comparator 12, where it is compared in phase with the reference signal 10 provided by the sonic generator 8 in a manner well known in the field of sonic measurements. The output of the phase comparator is an electrical potential the magnitude of which represents an analogue derivative of the phase displacement and is fed to a phase/position decoder 13 of the conventional plan-position indicator type. This decoder correlates the analogue signal with the position of transducer 6 to provide an indication of the distance of the eye surface from the platform of reference at a particular point $Z_0$, the location of which is determined by the location of transducer 6.

It is a purpose of this invention to provide a plot of the distance of the eye surface from the platform of reference throughout the entire circumference of the eye. To this end, transducer 6 is caused to scan the surface of the eye by rotating it about the optic axis while maintaining the transducer at all times within the hemispherical platform of reference. Thus, there is provided a support (not shown) for the transducer which includes a shaft 14 coaxial with the optic axis. This shaft 14 is mechanically coupled to and rotated by a prime mover, here shown as an electric motor 15 driven from a source of electrical energy 16. Also coupled to the shaft 14 is an angular position transfitter generally indicated at 17. This position transmitter can be of any suitable type, but is here illustrated as a conventional selsyn transmitter including a rotor 18 rotatable with the shaft 14 and a field 19 from which is derived an electrical signal which is a function of the angular position of shaft 14.

As previously mentioned, the phase/position decoder 13 correlates the analogue signal derived from the phase comparator 12 with the output of the selsyn 17 to present a plot of the eye surface contour. This function is conventionally carried out in a plan-position indicator, or P.P.I., by providing a cathode ray tube, the indicating surface of which is diagrammatically shown at 20 in FIGURE 2. The electron beam of the cathode ray tube is caused to sweep the indicating surface 20 from a point 21 at the center of the display surface outwardly in a direction dependent upon the signal derived from the position selsyn transmitter 17. The direction of sweep is so correlated with the position of transducer 6 relative to the focal point, or transducer 5, that the sweep will be directly upwardly as indicated by the designation 0° when the transducer 6 is disposed directly above the focal point, and the sweep of the indicator will correspond at all times in its angular relationship with the center 21 to the angular relationship of transducer 6 from transducer 5. By correlating a video unblanking signal derived from the analogue output of the phase comparator, a video representation 22 will be provided on the indicator surface at a point displaced from the center by a distance indicative of the distance of the point $Z_0$ on the eye surface from the platform of reference and in a direction indicative of the angular position of the point $Z_0$ with respect to the optic axis. The persistency of the indicating surface will cause the video representation to remain visible throughout an entire 360° sweep of the eye surface, thus providing a plot of a complete circumferential path.

In order to provide additional plots of the eye surface taken along paths of different circumference, transducer 6 may be moved to successively different radial points along said platform of reference, or additional transducers, as indicated at 7, may be provided at radially spaced points and selectively used to provide radially different points of transmittal.

The aforedescribed plan-position indicator is merely representative of one possible means of displaying the correlated position and distance information. Numerous other devices well known in the art may be employed, and any appropriate read-out mechanism 23 may be utilized for purposes of obtaining a permanent record. For a more complete disclosure of an appropriate indicator, reference is made to U.S. Patent No. 2,631,270 issued Mar. 10, 1953 to Ralph W. Goble.

While the choice of frequencies and of the particular dimensions used in the practice of this invention is well within the skill of those conversant with the ophthalmic and sonic arts, the interrelationship of the chosen wavelength and certain physical relationships of the apparatus are important. To illustrate this interrelationship, specific frequencies and dimensions are set forth for illustrative purposes only, with the understanding that this invention is not limited thereto, but is of a scope defined in the claims appended hereto. For purposes of example, a sonic frequency of 130 kcs. has been chosen. This frequency provides a wave length of 0.1 inch, which becomes the maximum measurable deviation of the surface contour from a predicted norm established by the contour platform of reference. A deviation of more than 0.1 inch would, of course, be represented by a phase deviation in excess of 360° and thus indistinguishable from a much smaller deviation, i.e., a deviation which would be represented by a phase difference 360° less than actually measured. This limitation is not unduly restrictive, however, when the dimensions of the eye are considered, inasmuch as the deviations from the predicted normal surface which are clinically significant involve variations of approximately 0.001 inch. Thus, the phase comparator 12 can be chosen to operate wholly within the first 180° of phase difference, with an output null centered at 90°. A phase difference of 3.6°, or $7 \times 10^8$ seconds in sound transit time, which is well within the practical measurable capability of currently available comparators, would represent a deviation of 0.001 inch in the scanned surface. At the same time, the selected frequency of 130 kcs. is a practical frequency for transmission in air, avoiding the difficulties of excessive absorption which are frequently encountered at higher frequencies.

In order to avoid ambiguities in indications which might be introduced by the intersection of the transmitted compressional wave beam with a portion of the surface of the eye which is normal to the path of the transmitted beam wherein only an insignificant amount of reflected energy would reach the transducer 5, it is appropriate that the center of curvature 4 of the platform of reference be displaced outwardly along the optic axis from the center of curvature 2 of the eye surface. The center of curvature 2 of the actual eye surface for any given point on the eye surface will vary with deviations of the surface contour from the mean, or predicted normal surface. Thus, the center of curvature 2 will fluctuate along the optic axis with the scanning of fluctuating surface contours. Thus, in order to avoid this fluctuation resulting in a coincidence of the centers of curvature 2 and 4, the distance between the points represented at (a) in FIG. 1 is chosen to approximately equal that measurable by a phase angle of 90°. At the chosen frequency of 130 kcs., this distance is .025 inch and thus well in excess of the desired range of measurable deviation.

In operation, the apparatus for carrying out this invention must be initially aligned with the optic axis of the eye undergoing measurement and properly displaced therefrom. This positioning is readily accomplished through the provision of an additional transmitting transducer 24 disposed at the focal point of the platform of reference, and preferably of a configuration coaxial with the focal point transducer 5. The output 9 of the sonic generator 8 is applied to transducer 24 by appropriate manipulation of switch 25 and is transmitted as a compressional wave train by transducer 23 along an acoustic axis defined by a radius of said platform of reference to intersect and reflect from the eye surface. The reflected signal as received at transducer 5 is monitored in amplitude by an indicator, such as alignment readout 26. With the patient's gaze fixed on a target (not shown) at the focal point, the transducer array comprising the platform of reference is raised or lowered and shifted laterally until a point is reached where the alignment read-out signal is at maximum. This reading indicates coincidence of the optic axis 3 and the acoustic axis of the coaxial transducers 5 and 24. The array is then moved along this axis away from the surface of the eye until a phase displacement of 90° is indicated at the output of comparator 12. At this point, the aforementioned spatial relationship (a) of the centers of curvature 2 and 4 is obtained. The centering of the transducer array with the optic axis can be confirmed by diverting the output of sonic generator 8 through switch 25 to the transducer 6 and observing the output of the phase/position decoder at various angular positions of the array. Diametrically opposite positions should give substantially equal phase differences for an array properly centered with a substantially symmetrical eye surface. Major differences indicate a need to check previous alignment steps in order to ascertain whether the differences are due to misalignment or to major deviations in surface contour.

The array having been properly aligned with the optic axis, it is placed in rotation by the energization of the prime mover 15. Transducer 6 is energized from the sonic generator 8 to direct an acoustical train in a path directed toward the center of curvature 4 of the platform of reference. Sonic energy reflected from the point $Z_0$ of intersection of this acoustic path with the eye surface is received at transducer 5 after a time delay dependent upon the sound transit time, which in turn is dependent upon the distance of point $Z_0$ from the platform of reference, and rotation of the array causes this point $Z_0$ to scan a circumferential path around the optic axis 3. The delayed sonic signal is converted at transducer 5 to an electrical signal which is amplified at 11 and passed to the phase comparator 12. In order to derive an analogue value which is a function of the aforesaid sound transit time, or distance, the amplifier output is compared in phase with a reference signal derived directly from the sonic generator and thus coincident in time with the transmitted sonic signal. As a result of the aforedescribed alignment procedure, a phase difference of 90° indicates a distance of point $Z_0$ from the reference plane equal to an optimum, or predicted norm.

The analogue output of the phase comparator is further correlated with the angular position of point $Z_0$ with respect to the optic axis 3 by presenting it to a display device or decoder 13 in a position determined by the output of the shaft position transmitter 17, and appropriate read-out means 23 may be provided for utilization of the decoder output.

From the foregoing description it can be seen that this invention provides a method by which extremely accurate measurements of the surface contour of the eye can be made by a relatively simple procedure. The invention also includes an apparatus for carrying out the method, which apparatus is relatively simple in make-up while exhibiting extreme accuracy under relatively simple clinical procedure. While the invention has been described with particularity as a specific embodiment thereof, it is to be understood that this description is for the purpose of compliance with the requirements of Section 112 of the Patent Act of 1952, and does not constitute a limitation of the scope of the invention to the particular embodiment described. As my invention,

I claim:
1. Apparatus for measuring the surface contour of an eye having a center of curvature equidistant from points describing a predicted normal contour, said apparatus comprising an array of at least two transducers, support means for said array, said means supporting said array in a semi-spherical perimeter defining a platform of reference, said array including a central axis and a receiving transducer located on said axis of said array, said array further including a transmitting transducer disposed at a point of transmittal spaced from said receiving transducer, a sonic generator comprising first and second outputs, said first output being electrically coupled to said transmitting transducer and effective to cause said transmitting transducer to project sonic energy against the surface of the eye in a path directed toward a center of curvature of said semi-spherical perimeter, said last named center of curvature being displaced outwardly from the center of predicted normal curvature of the eye, means for electrically determining the transit time of sonic energy reflected from the eye surface to said receiving transducer, said last named means comprising a phase comparator having inputs electrically coupled respectively to said second sonic generator output and to said receiving transducer and effective to derive an output the amplitude of which is a function of the phase displacement of said comparator inputs.

2. Apparatus for plotting the surface contour of the eye as set forth in claim 1, said apparatus additionally comprising means for rotating said array about its axis, means for detecting the angular position of said transmitting transducer with respect to said axis, and means for correlating said detected angular position with said comparator output.

3. Apparatus for measuring the surface contour of the eye as set forth in claim 1, said apparatus including an additional transmitting transducer coaxial with said receiving transducer, means for applying said first output of said sonic generator selectively to said additional transmitting transducer, means for deriving a signal from said receiving transducer the amplitude of which is a function of the strength of said reflected sonic energy, said support means including means for adjusting said array relative to the optic axis of said eye while observing the amplitude of said derived signal.

4. Apparatus for measuring the surface contour of the eye as set forth in claim 3, wherein said support means includes means for adjusting said array along said axis of rotation whereby said second named center of curvature is displaced from said first named center of curvature by a distance measurable by a comparator output representing a phase displacement of substantially 90°.

References Cited
UNITED STATES PATENTS
| | | | |
|---|---|---|---|
| 2,940,305 | 6/1960 | Williams et al. | 73—67.8 |
| 3,176,263 | 3/1965 | Douglas | 73—69 X |

OTHER REFERENCES
G. Henry Mundt, Jr., and William F. Hughes, Jr., "Ultrasonics in Ocular Diagnosis," American Journal of Ophthalmology, vol. 4, issue 3, March 1956, pp. 488–498.

DAVID SCHONBERG, *Primary Examiner.*

P. A. SACHER, *Assistant Examiner.*

U.S. Cl. X.R.

73—67.7; 351—1